United States Patent [19]
Wise et al.

[11] Patent Number: 5,513,974
[45] Date of Patent: May 7, 1996

[54] MANIFOLD ASSEMBLY WITH ATMOSPHERIC VENT

[75] Inventors: John Wise; Larry L. Martin, both of Hamilton, Ohio

[73] Assignee: Advanced Drainage Systems, Inc., Columbus, Ohio

[21] Appl. No.: 224,558

[22] Filed: Apr. 7, 1994

[51] Int. Cl.$^6$ .................................................. B29C 47/76
[52] U.S. Cl. ........................................... 425/393; 264/568
[58] Field of Search .................................. 425/393, 403, 425/378.1, 72.1, 326.1, 387.1; 264/560, 563, 209.4, 568, 177.17, 209.8, DIG. 41, 285, 286, 168

[56] References Cited

U.S. PATENT DOCUMENTS

| | | | |
|---|---|---|---|
| 3,169,272 | 2/1965 | Maxson | 425/378.1 |
| 3,320,637 | 5/1967 | Van Disk | 425/378.1 |
| 3,660,000 | 5/1972 | Yoshida et al. | 425/393 |
| 3,907,961 | 9/1975 | Carrow | 264/568 |
| 4,377,545 | 3/1983 | Hornbeck | 264/568 |
| 4,663,107 | 5/1987 | Takada et al. | 264/568 |
| 4,770,618 | 9/1988 | Lupke | 425/378.1 |
| 4,808,098 | 2/1989 | Chan et al. | 425/72.1 |
| 5,186,878 | 2/1993 | Lupke | 264/568 |
| 5,296,188 | 3/1994 | Lupke | 425/393 |
| 5,320,797 | 6/1994 | Hegler et al. | 425/393 |

Primary Examiner—Richard L. Chiesa
Attorney, Agent, or Firm—Biebel & French

[57] ABSTRACT

An improved manifold assembly which can be used in the extrusion of a plastic with the manifold assembly having a die having a first end and a second end, with the die having a die head sectored at the second end, sets of a plurality of tubes located centrally of one another, each set positioned longitudinally within a respective die manifold tube with the outermost surface of each set of tubes spaced a first distance from the die manifold tube, each of the die manifold tubes extending through the die, at least two calibration fingers secured to the die, each of the calibration fingers having a proximal portion adjacent the die head, the proximal portion of each calibration finger being spaced a second distance from the die head, with the manifold assembly being vented to atmosphere by a venting channel, the venting channel extending from between the proximal tip and the die head to the first end of the die head with a portion of the venting channel being between the die manifold tube and the otuermost surface of each set of tubes.

7 Claims, 7 Drawing Sheets

MANIFOLD ASSEMBLY WITH ATMOSPHERIC VENT

BACKGROUND OF THE INVENTION

This invention relates generally to a manifold assembly for use with a die head in the extrusion of a plastic, and more particularly to an improved structure having an atmospheric vent, which manifold structure assembly is capable of forming a pipe wall with apertures therein when the pipe is examined in cross-section.

Plastic pipe has found a variety of uses especially relating to drainage. One of the concerns in the manufacture of plastic pipe is the amount of raw materials consumed and the resultant weight of the finished product. For example, 48" interior diameter solid wall plastic pipe weighs approximately 200 lbs per foot. It has recently been discovered that plastic pipe having apertures formed therein, when the pipe is viewed in cross-section, weighs approximately 30 lbs per linear foot. However, a problem exists in designing a machine capable of manufacturing pipe having the desired cross-section.

In general, extruded plastic pipe is formed on a production line having a variety of specific machines incorporated into the manufacturing process. One of the first machines is an extruder. Plastic powder, or more preferably pellets, is Fed through the extruder where it is subjected to high temperatures such that the plastic melts. The liquified plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers or bullets which assist in maintaining the desired cross-sectional form which has been extruded. These calibration fingers are part of a manifold assembly. The rest of the manifold assembly extends from above the die as well as beyond the calibration fingers. In addition to the extruder and die, which is supported on a die post assembly, plastic pipe is manufactured using a former or forming head.

Prior art manifold assemblies have limited the ability to manufacture a plastic product which is aesthetically pleasing if that product has a cross-section which incorporates apertures. It is thus apparent that the need exists for an improved manifold assembly which can manufacture an aesthetically pleasing product having the desired cross-section.

SUMMARY OF THE INVENTION

The problems associated with prior manifold assemblies are overcome in accordance with the present invention by the presence of an improved manifold assembly which can be used in the extrusion of a plastic with the manifold assembly comprising a die having a first end and a second end, with the die having a die head secured at the second end, sets of a plurality of tubes located centrally of one another, each set positioned longitudinally within a respective die manifold tube with the outermost surface of each set of tubes spaced a first distance from the die manifold tube, each of the die manifold tubes extending through the die, at least two calibration fingers secured to the die, each of the calibration fingers having a proximal portion adjacent the die head, the proximal portion of each calibration finger being spaced a second distance from the die head, with the manifold assembly being vented to atmosphere by a venting channel, the venting channel extending from between the proximal tip and the die head to the first end of the die head with a portion of the venting channel being between the die manifold tube and the outermost surface of each set of tubes.

The first end of the die has formed therein a venting channel outlet, with this preferably being just a single aperture. Also preferably, each venting channel converges into a common enclosed airspace directly adjacent said venting channel outlet.

There is also disclosed an improved manifold assembly which can be used in the extrusion of a plastic with the manifold assembly comprising a die having a first end and a second end, with the die having a die head secured at the second end, said first end of the die having formed therein a venting channel outlet, with this preferably being just a single aperture, sets of a plurality of tubes located centrally of one another, each set positioned longitudinally within a respective die manifold tube with the outermost surface of each set of tubes spaced a first distance from the die manifold tube, each of the die manifold tubes extending through the die, at least two calibration fingers secured to the die, each of the calibration fingers having a proximal portion adjacent the die head, the proximal portion of each calibration finger being spaced a second distance from the die head, with the manifold assembly being vented to atmosphere by a venting channel, the venting channel extending from between the proximal tip and the die head to the first end of the die head with a portion of the venting channel being between the die manifold tube and the outermost surface of each set of tubes, each said venting channel converges into a common enclosed airspace directly adjacent said venting channel outlet.

It is the primary object of the present invention to provide an improved manifold assembly which can manufacture pipe having a plurality of apertures formed therein when the pipe wall is viewed in cross-section, with such pipe being aesthetically pleasing.

Other objects and advantages of the invention will be apparent from the following description, the accompanying drawings, and the appended claims.

3

DETAILED DESCRIPTION OF THE PREFERRED EMBODIMENT

Figure 1:
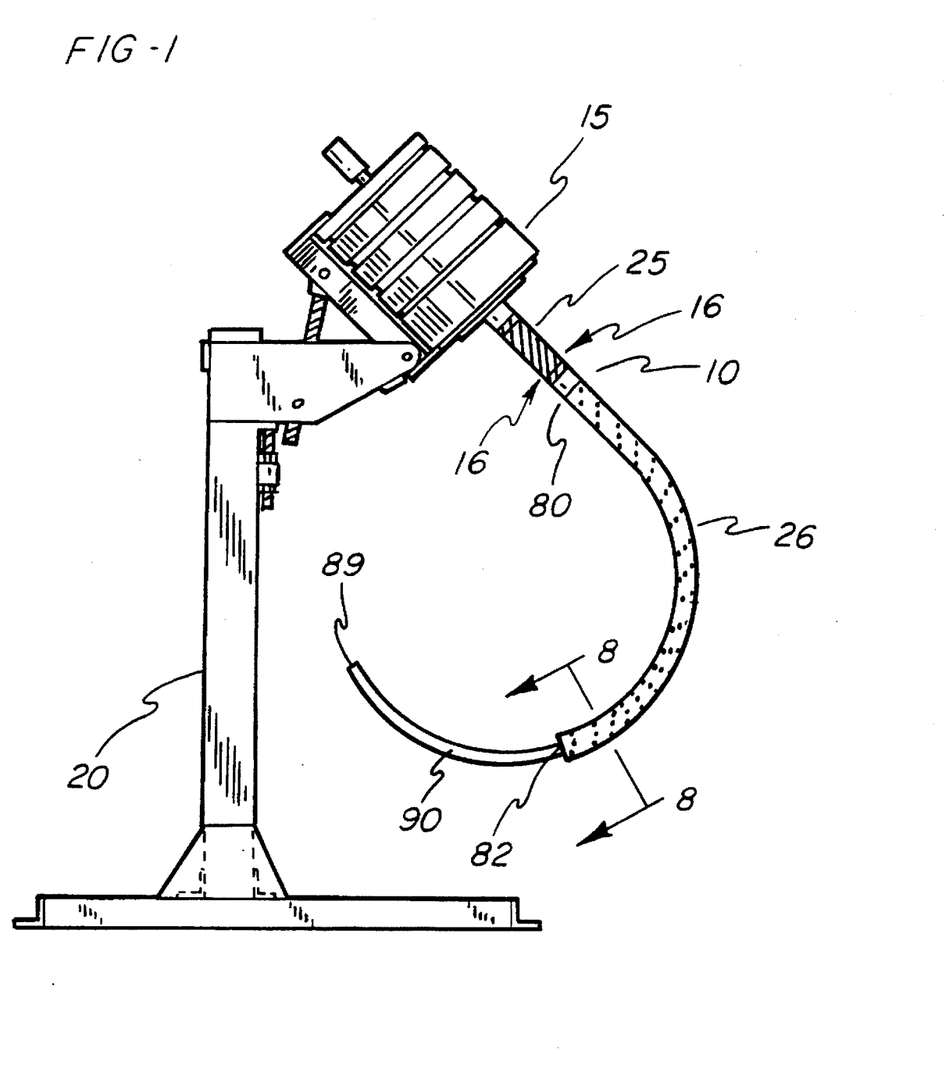
FIG. 1 is a side view of a die and die post assembly with a manifold assembly formed in accordance with the present invention secured thereto in an operative position.

Having reference to the drawings, attention is directed first to FIG. 1 which shows the improved manifold assembly associated with this present invention generally disclosed by the numeral 10. The manifold assembly extends through die 15. Drum shaped die 15 having first and second ends is supported on a die post assembly 20. The die and die post are of the type found in plastic extrusion manufacture. The preferred embodiment of this invention utilizes a side fed spiral feed die, although it could use a side fed spider die. Similarly, the improved manifold calibration fingers 16 are located where calibration fingers of the prior art have been located, namely, at the second end of the die where the plastic is extruded therefrom.

Figure 2:
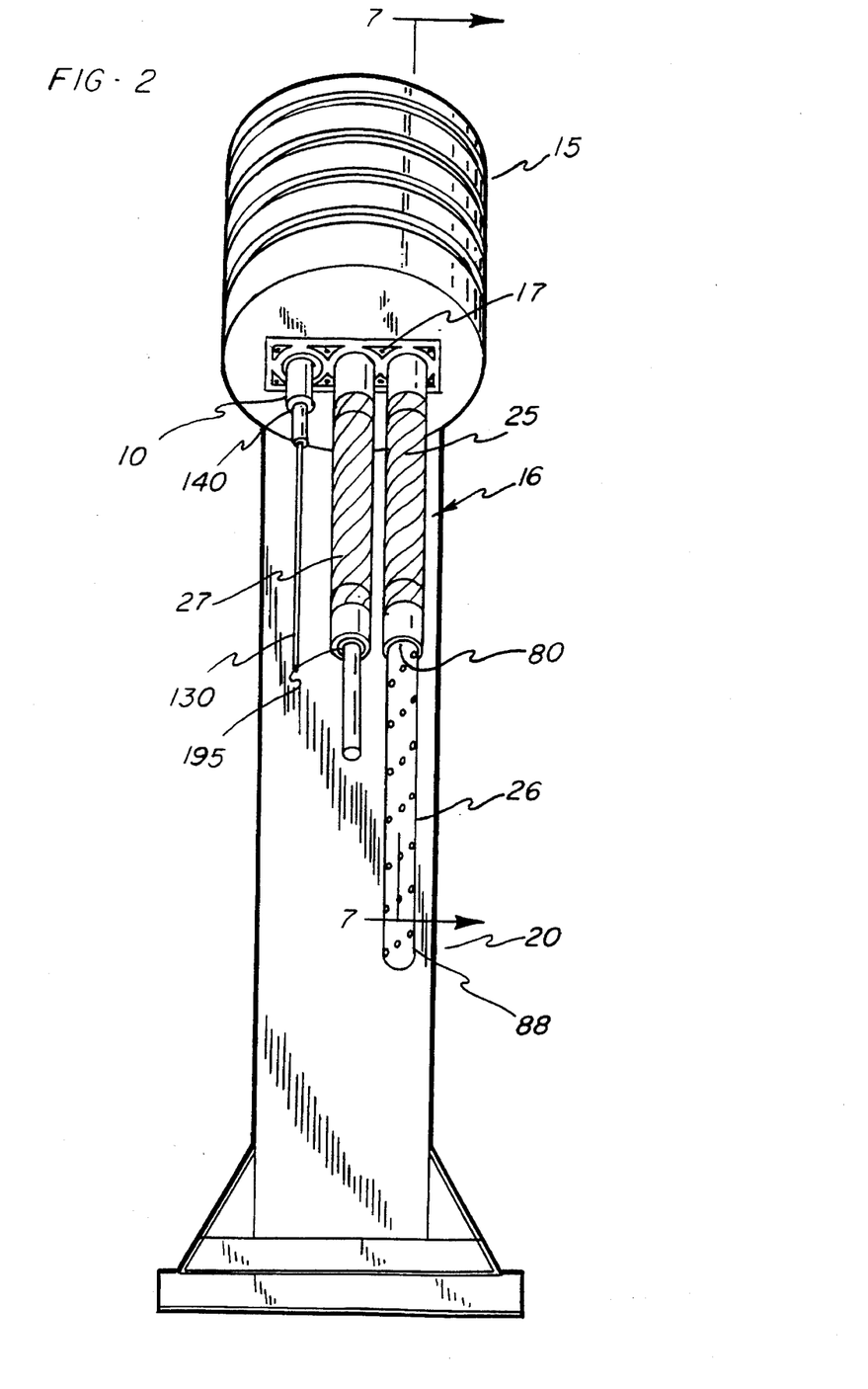
FIG. 2 is a front elevational view of a die and die post assembly in which the die will extrude the wall of a plastic pipe having apertures formed therein, specifically 8 small generally triangular shaped apertures as well as 3 larger generally circular shaped apertures.

This spatial relationship can better be appreciated from consideration of FIG. 2 which discloses the presence of a die head 17. Die heads are well known in the conventional extrusion art. However, this particular die head discloses the presence of 8 small triangular sections or openings and 3 larger circular sections or openings which will permit the extrusion therethrough of a pipe wall having a plurality of apertures formed therein. Extending through the die and die head 17 is a portion of the die manifold assembly 10 to which this invention is physically secured. This portion of the die manifold assembly 10 is shown at the left-most side of the die head 17 and extends some distance from the drum-shaped die, as will be discussed below.

At the right-most side of the die head 17 is the calibration finger 16 associated with the manifold 10 of this present invention shown in its complete assembly, as can be appreciated from a comparison with FIG. 1. The calibration finger 16 associated with this invention is formed having a first section 25 and a second section 26. The first section or tubular member 25 is shown secured by itself to the portion of the die manifold assembly 10 which passes through the die 15 at the center portion of the die head 17 in FIG. 2.

Figure 3:
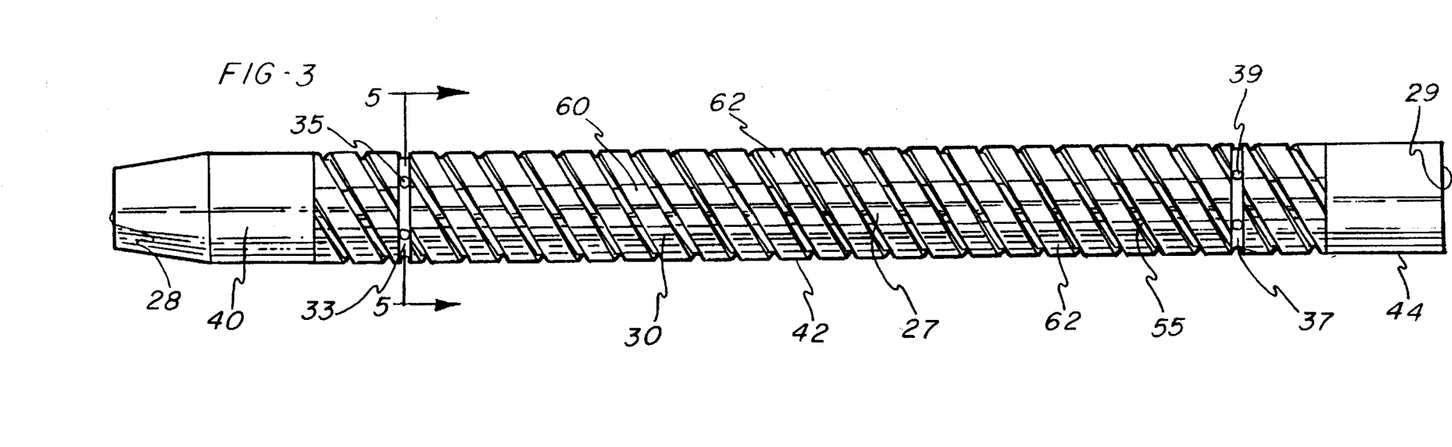
FIG. 3 is a side elevational view of the calibration finger first section of the improved manifold assembly of this invention.

The first tubular member 25 is formed in the preferred embodiment of the invention having a tubular outer shell 27. As can be better appreciated from a comparison of FIGS. 2 with FIGS. 3, 5 and 7, the tubular outer shell 27 has a first end as well as a second end, 28 and 29 respectively. Additionally, the outer shell 27 is formed having an outer surface 30 with this outer surface 30 having formed therein a first radial groove 33. Formed in the first radial groove are a plurality of first section apertures 35. Additionally, in the preferred embodiment of the invention a second radial groove 37 is formed having a plurality of second section apertures 39 formed therein.

The tubular outer shell is preferably formed having a first finger end 40, a finger shell 42, and a second finger end 44. These three pieces are components of the tubular outer shell and are secured to each other by respective connecting rings 48. Each brass connecting ring 48 is merely a ring with a threaded outer surface which engages with a portion of the inner surface of the finger shell 42. A threaded portion of the inner surface of first finger end 40 also engages with the connecting ring 48, with that first finger end inner surface being 52. A threaded portion of the inner surface of second finger end 44 also engages with the connecting ring 48, with that second finger end inner surface being 53. It will be appreciated from FIG. 3 that the first finger end is tapered towards the die head. This permits an easier initial flow of the heated plastic over the calibration finger 16 as the plastic exits the die head 17.

In addition to first radial groove 33 and second radial groove 37 the outer surface 30 of tubular outer shell 27 also preferably has formed therein a spiral groove 55. It should also be appreciated that the spiral groove intersects with both the first radial groove and the second radial groove in the preferred embodiment of the invention. It will also be appreciated from a comparison of FIGS. 3 and 5 that the outer shell of the first section 25 of the centralmost set of tubes is preferably formed having two relatively flat surface portions 60 and two curved surface portions 62, whereas the outer two sets of tubes have a flat surface only with respect to their inner side wall as can be seen in FIGS. 5A and 5B respectively.

Figure 4:
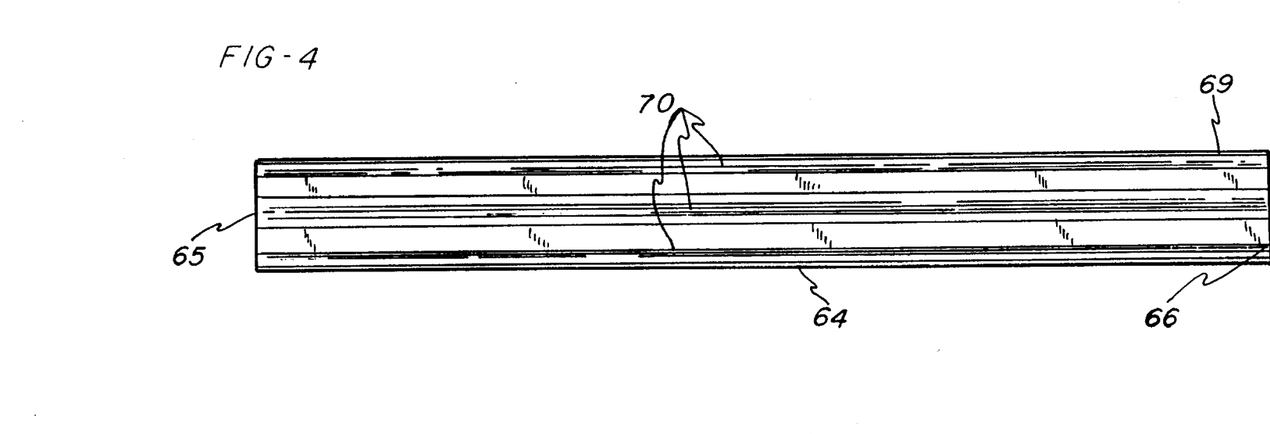
FIG. 4 is a side elevational view of the intermediate tube which in the preferred embodiment of the invention is formed and then inserted within the calibration finger first section shown in FIG. 3.
Figure 5:
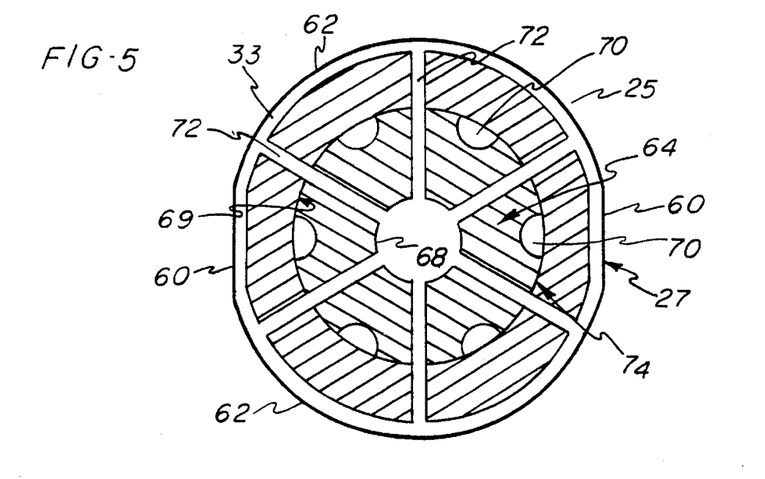
FIG. 5 is a vertical sectional view taken on a greatly enlarged scale along line 5—5 of FIG. 3, however, this particular view shows the calibration finger first section as assembled thereby disclosing both the outer shell as well as the presence of the intermediate tube.
Figure 5A:
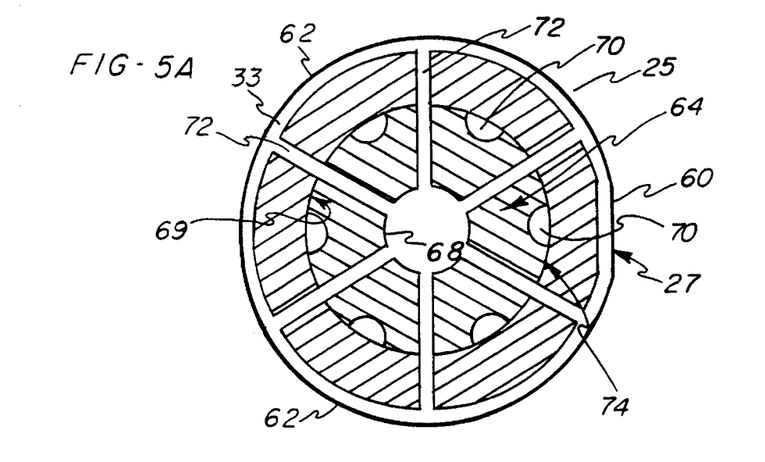
FIG. 5A is a vertical sectional view taken on a greatly enlarged scale and similar to FIG. 5, however, this particular view shows one of the endmost calibration finger first section as assembled.
Figure 5B:
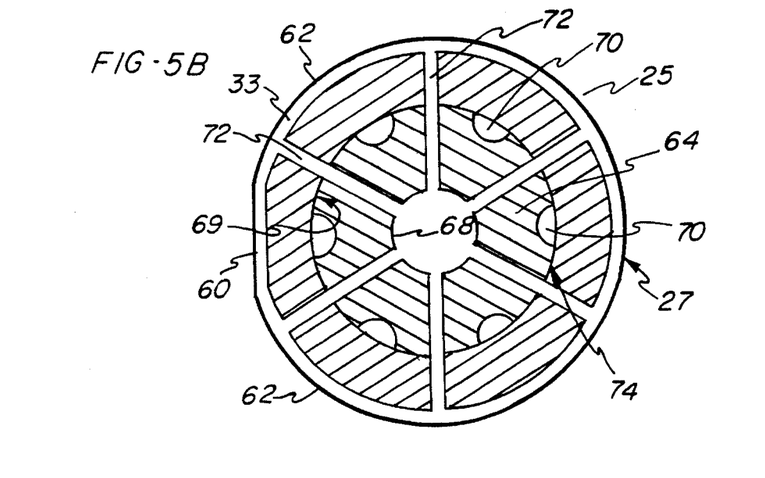
FIG. 5B is a vertical sectional view taken on a greatly enlarged scale and similar to FIGS. 5 and 5A, however, this particular view shows the other endmost calibration finger first section as assembled.

The intermediate tube 64 shown in FIG. 4 also has a first end 65 and a second end 66, and an inner surface 68 as can be appreciated from FIG. 5 as well as the outer surface 69 as can be appreciated from both FIGS. 4 and 5. A plurality of generally longitudinally extending channels 70 are formed in the outer surface 69 of intermediate tube 64. In the preferred embodiment of the invention there are six such water receiving channels 70.

As stated above, FIG. 5 shows a vertical cross-sectional view on a greatly enlarged scale wherein the intermediate tube is positioned so as to be encircled by the tubular outer shell 27. As such, the various water receiving channels 70 may be seen to become enclosed such that they permit the passage of water in a first direction through the die and towards the second section. Additionally, the presence of the cool water in the six channels helps to cool the tubular outer shell in the presence of the hot plastic.

As can also be seen in FIG. 5, the first tubular member 25 also has a plurality of radially extending channels 72 which extend from the inner surface 68 of intermediate tube 64 to the apertures in either radial groove 33 or 37. As will be discussed below, the inner surfaces 68 of the intermediate tube 64 help to define a channel through which a vacuum is pulled.

In actual assembly of the first tubular member, the tubular outer shell has the intermediate tube placed therein then the appropriate holes are drilled through both the tubular outer shell and the intermediate tube. First, the tubular outer shell and intermediate tube are welded with the inner surface of the outer shell 27 being welded to the outer surface 69. Once the two components are stabilized and a 3/32" diameter hole is drilled, a 3/32" outer diameter aluminum tube with a 1/16" hole is press fit into the 3/32" hole until it reaches the inner surface 68. This process is repeated until the desired number of channels exist, which in the preferred embodiment shown in FIG. 5 is six. The tops of the tubes can be filed off and each respective radially extending channel 72 sealed in place with an appropriate sealant. Preferably the radial groove is placed on the outer shell after the aforementioned welding and drilling have occurred, but before the insertion of the tubes which make the radially extending channel 72.

The finger shell 42 is approximately 18" long in the preferred embodiment of the invention and has an outer diameter of approximately 2½". Preferably the center of the first radial groove is 2½" from the junction of the finger first end and finger shell. Meanwhile, the second radial groove is approximately 1⁹⁄₁₆" from the junction of the second finger end and finger shell. The spiral groove is ³⁄₃₂" wide and has a 1" pitch double lead over the entire 18". Similarly, the radial grooves are ³⁄₃₂". Furthermore, the various longitudinally extending channels 70 are formed having a radius of ⁵⁄₁₆". Further, each of the slots are formed being ¼" from the high point of the radius. The intermediate tube is approximately 16½" long and has an outer diameter such that it fits the inner diameter of the outer shell. Preferably both the outer shell and the intermediate tube are fabricated from aluminum.

As can be appreciated from a comparison of FIGS. 1, 2, 7 and 8 the second tubular member 26, also fabricated of aluminum, comprises a first end 80 and a second end 82 as well as an inner surface 84 and an outer surface 86. The longitudinal shape of the second tubular member 26 corresponds to the shape of the plastic product to be produced. Where as here the fabrication system is designed to produce circular plastic pipe, the longitudinal shape of the second section 26 is curved. As can be appreciated in the drawings, the second tubular member 26 also has a plurality of apertures 88 formed therein with these apertures extending between the inner surface 84 and the outer surface 86 of the second tubular member 26. Thus it can be appreciated that the second end of the tubular outer shell 27 of the first tubular member 25 is attached to the curved member first end 80.

It should also be appreciated that the first tubular member is of a first length and the second tubular member is of a second length with this second length being longer than the first length. For example, in the embodiment of the invention discussed herein, the second tubular member measures 42" in length, with the first 3" being straight. Specifically it should also be appreciated that the diameter of the curved member apertures are greater than the diameter of the first member apertures, primarily because the curved member apertures facilitate the flow of water therethrough while the first member apertures are used to facilitate the pulling of a vacuum. The vacuum assists in stabilizing the shape of the plastic as it is extruded.

Figure 6:
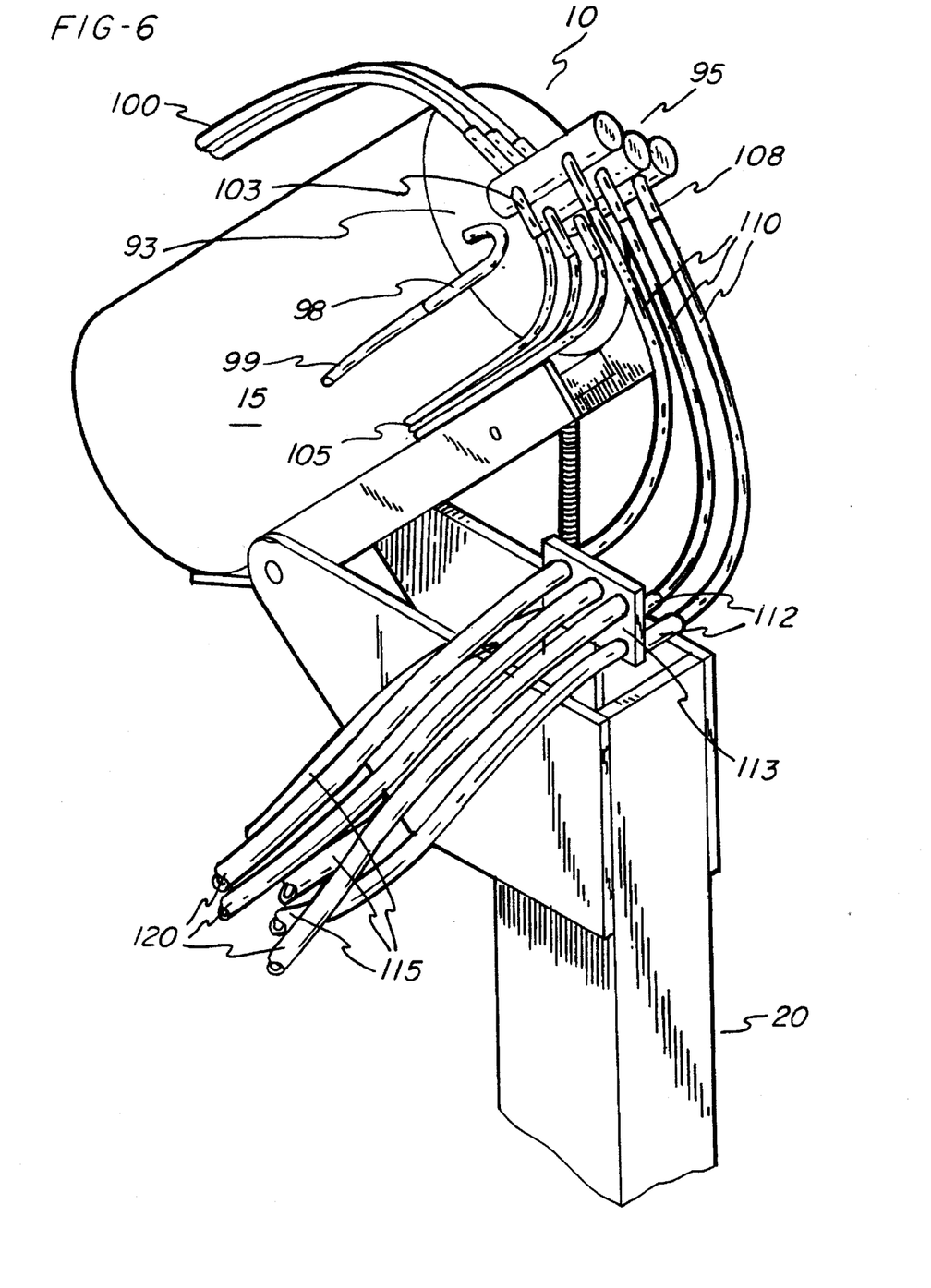
FIG. 6 is a perspective view on a greatly enlarged scale taken from the top of the die of FIG. 1.
Figure 7:
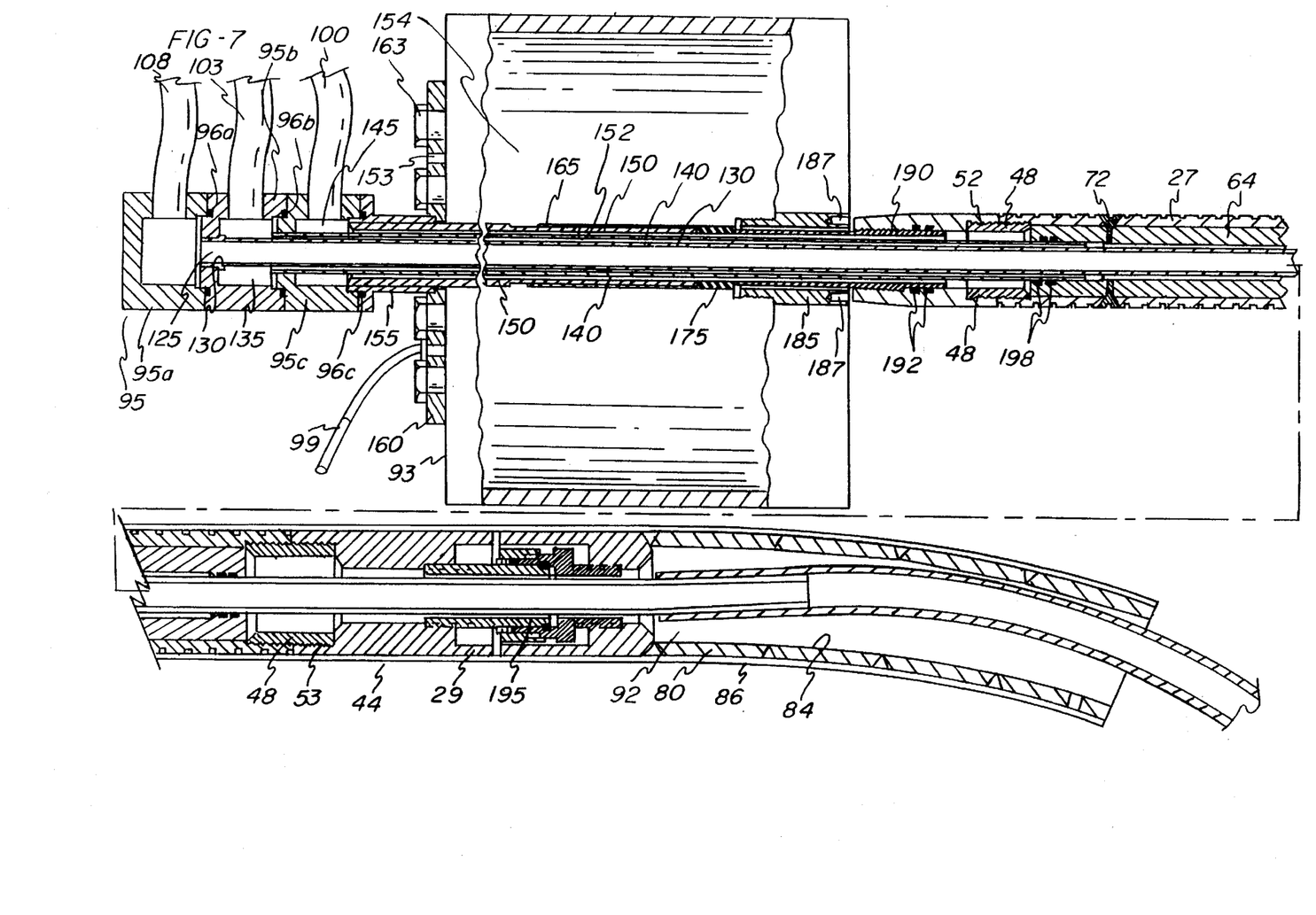
FIG. 7 is a vertical cross-sectional view on an enlarged scale taken along line 7—7 of FIG. 2.
Figure 8:
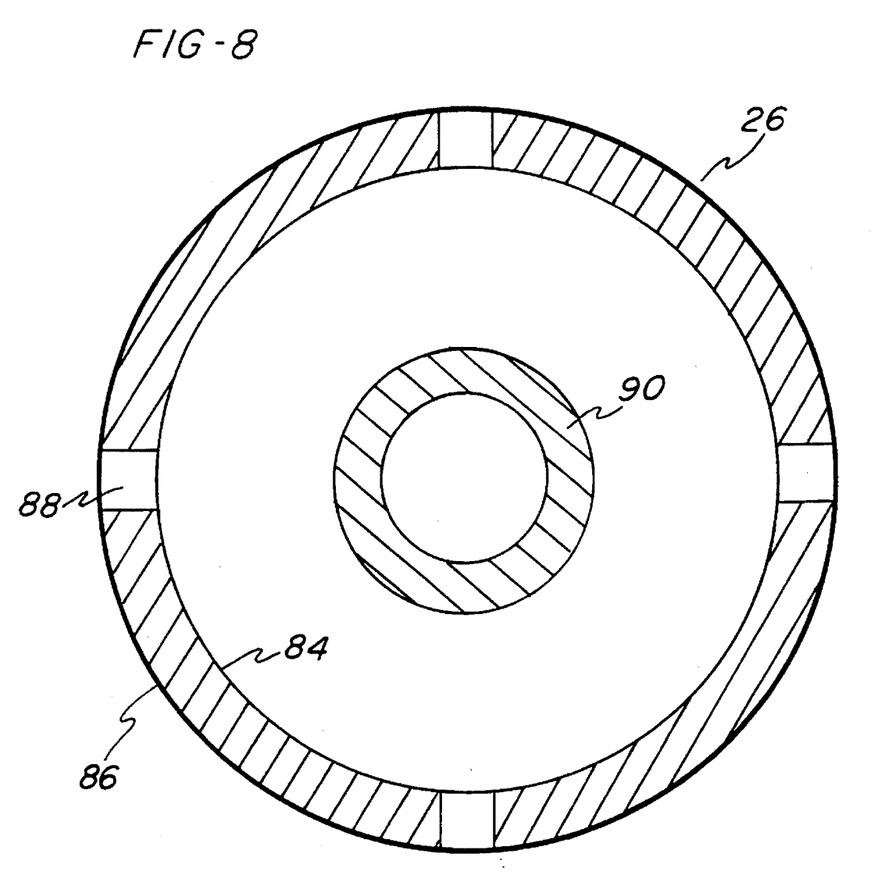
FIG. 8 is a vertical cross-sectional view on a greatly enlarged scale taken along line 8—8 of FIG. 1.

The portion of the die manifold assembly 10 secured to die 15 can best be appreciated from a comparison of FIGS. 6 and 7. As can be appreciated from those drawing figures, the die head first end or rear face 93 has secured thereto a rear manifold tube housing 95, with this securing preferably accomplished by four screws. In actual fabrication this rear manifold tube housing comprises three components 95a, 95b, and 95c respectively. It will also be appreciated that manifold tube housing O-rings 96a, 96b, and 96c are positioned adjacent the corresponding rear manifold tube housing component.

A TEFLON® insulative tube 98 connects the interior of the die at the die head rear face 93 with a low pressure air inlet line 99. Still further, a water inlet line, with one tube for each manifold calibration finger is secured to the rear manifold tube housing. This water inlet line 100 permits cool water to be introduced into the manifold assembly. Preferably the flow rate is 4–5 gallons of water per minute per each set of tubes.

A rear vacuum pipe 103 extends from the rear manifold tube housing 95 and connects to a rear vacuum line 105. Once again it will be appreciated that the number of rear vacuum pipes 103 and hence the number of rear vacuum lines 105 correspond to the number of calibration fingers 16. A water expulsion pipe 108 also extends from the rear manifold tube housing 95 with each water expulsion pipe 108 being connected to the water expulsion outlet line first section 110. While the rear vacuum pipe and water expulsion pipe are preferably formed of metal, the rear vacuum line as well as the water expulsion outlet line first section are of plastic composition. Each of the water expulsion outlet line first sections 110 connect to a water ejector 112. It has been found that a well ejector package sold by Teel Water Systems as a heavy duty shallow well ejector works quite well to facilitate-the removal of water through the manifold following its circulation therethrough. The various water ejectors 112 are secured to a water ejector mounting plate 113 which is part of the die post assembly 20. To facilitate the operation of the water ejector 112 a respective water expulsion inlet lines 115 are secured at the water ejector mounting plate to be secured to the water ejector 112. Similarly, a respective water expulsion outlet line second sections 120 are secured at the water ejector mounting plate to the water ejector. In actual operation, the flow of water through the water expulsion inlet lines 115 into the water ejectors 112 creates a venturi effect which results in the formation of a vacuum which in turn draws the water through the respective water expulsion line first sections and thereafter forceably expels water through the water expulsion outlet line second section 120.

Yet a better appreciation of the inner workings of this improved die manifold assembly 10 can be appreciated from consideration of FIG. 7 which shows a water expulsion port 125 through which the water passes as it is drawn through the calibration finger and secured manifold assembly and then flows through the water expulsion outlet line first sections. The water enters the water expulsion port 125 from the inner manifold tube 130 which is connected to the proximal end 92 of the second component 90.

It will also be appreciated that within rear manifold tube housing component 95b is a vacuum port 135. The rear manifold tube housing component 95b is preferably welded to vacuum tube 140. Similarly, rear manifold tube housing 95c is preferably welded to outer manifold tube 150. Meanwhile rear manifold tube housing component 95a is preferably screwed onto inner manifold tube. The distal end of the vacuum tube 140 is held in frictional engagement by the inner surface 68 of the intermediate tube 64 of first section 25. When the second component 90 is frictionally secured to the distal end of the inner manifold tube 130, the rear vacuum line and rear vacuum pipe 103 permit a vacuum to draw inwardly through the apertures in the radial grooves.

Also shown is a water inlet port 145 through which the water enters the rear manifold tube housing 95c through water inlet line 100. The water thus flows through respective outer manifold tubes 150. A housing connector 155 secures the rear manifold tube housing to a manifold mounting plate 160 which in turn is secured to the die head first end or rear face 93 by appropriate fasteners 163.

Thus, as die manifold tube 165 extends through the die itself, it has therein the outer manifold tube 150 through which cool water is flowing in a first direction, vacuum tube 140 through which a vacuum is being pulled in the opposite direction to the flow of the cool water, and inner manifold tube 130 through which warm water is also being pulled in that second direction thereafter exiting through the water expulsion lines. The outermost surface of each set of tubes 150, 140, and 130 respectively, that being in the preferred embodiment of the invention the outer surface of tube 150, is spaced a first distance from the respective die manifold tube. Each of inner manifold tube 130, vacuum tube 140 and outer manifold tube 150 is preferably fabricated from stainless steel. Within die manifold tube 165 is a preferably hex shaped structure 175 which is placed so as to aid in the support and stabilization of the outer manifold tube 150. It also minimizes the transfer of heat between the cooler tubes and the warmer ones. This hex shaped structure 175 can be appreciated as being positioned adjacent mandrel extension tube 185 of the die, which mandrel extension tube in turn is secured at the front face of the die head at die head apertures 187, which are preferably spanner wrench holes. Mandrel extension tube is screw threaded into a mandrel extension component of the die, with the mandrel extension of the type known in the art.

The space between the inner surface of the die manifold tube 165 and the exterior surface of outer manifold tube 150 forms a venting channel 152. Thus the manifold assembly of this invention is vented to atmosphere by the cooperation of venting channel 152, venting channel outlet 153 and enclosed common airspace 154. Preferably the venting channel outlet is just a single aperture in the first end of the die, even where as in the embodiment of the invention as shown, there would be three venting channels. Meanwhile, the plurality of venting channels associated with each of the sets of tubes preferably converge near the rear interior of the die so as to form a single enclosed common airspace. More preferably, this enclosed common airspace is directly adjacent the venting channel outlet.

It can be appreciated from consideration of FIG. 7 that proximal tip 40 and die head 17 are spaced apart a second distance. Thus, the venting to atmosphere extends from the approximate ⅛" space between the proximal tip 40 and the die head 17 to the first end of said die with the portion of the venting channel between the die manifold tube and the outermost surface of each set of tubes being only about ¹⁄₁₆".

In actual assembly, the die is assembled so as to encompass the portion of the manifold assembly shown and discussed above with respect to FIG. 7. When finished it resembles the left-most portion of the die head as seen in FIG. 2. The first section 25 is then slid over the secured die manifold assembly 10. The first finger threads 190 are then secured to the threaded terminal corresponding terminal end of the outer die manifold tube. Helping to maintain a good seal are a first pair of O-rings 192 placed within appropriate grooves on the first finger end inner surface 52 as shown in FIG. 7. The first tubular member then is positioned as shown in the middle of die head 17. The second tubular member at its first end 80 has a quick release female mechanism of the type well known in pipe art, which mechanism joins with the quick release male mechanism 195 positioned at the second end 66 of the intermediate tube 64. Thus, when used in combination to form three circular apertures through a pipe wall when viewed in cross-section, the flat sections 60 on each of the calibration fingers are parallel to a flat section on an adjacent calibration finger. A second pair of O-rings 198 are found in appropriate grooves on the inner surface 68.

In actual use, the presence of the atmospheric vent is extremely important. Initially the machine did not utilize this feature and the hot plastic, in effect, was sucked down into the space between the proximal end of the calibration finger and the die head where it clogged the extrusion operation. The addition of the atmospheric vent unexpectedly more than remedied the situation. Instead of clogging, the plastic easily flowed over the outer surfaces of the calibration fingers.

Further, in actual use the cooling water passes through the water inlet tube 150 and the water receiving channels 70 within each manifold calibration finger while a vacuum is pulled through the middle manifold tube 140 and through the radially extending channels 72 in the first section. Still Further, water flows from the water receiving channels into the second section 26 and thereafter through the apertures 88 in the second tubular member onto the outer surface 86 of such calibration finger. The water thus flows between the outer surface of the second section and the extruded plastic which surrounds the calibration finger when the plastic is being extruded. The water is deposited within the cavity of the extruded plastic.

Eventually the water level within the cavity reaches the distal tip 89 of the flexible tube 90 where it is sucked back through the interior of this second component 90, through the second component's juncture with the first component 130 preferably within the second section 26, through the water return tube or first component 130 encircled by the die, and finally through the respective tube connecting the water return tube outlet with the water ejector 112.

It will be readily apparent from the foregoing detailed description of the illustrative embodiment of the invention that a particularly novel and extremely unique improved manifold assembly is provided. While the form of apparatus described herein constitutes the preferred embodiment of the invention, it is to be understood that the invention is not limited to this precise form of apparatus and that changes may be made therein without departing from the scope of the invention which is defined in the depended claims.

What is claimed is:

1. An improved manifold assembly for use in the extrusion of a plastic with the manifold assembly comprising a die having a first end and a second end, said die having a die head secured at said second end, sets of a plurality of tubes located centrally of one another, each said set positioned longitudinally within a respective die manifold tube, each said set of tubes having an outermost surface with the outermost surface of each said set of tubes spaced a first distance from said respective die manifold tube, each of said respective die manifold tubes extending through the die, at least two calibration fingers secured to the die, each of said calibration fingers having a proximal portion adjacent said die head, said proximal portion of each of said calibration fingers being spaced a second distance from said die head, and a venting channel, said manifold assembly being vented to atmosphere by said venting channel, said venting channel extending from between said proximal portion of each of said calibration fingers and said die head to the first end of said die with a portion of said venting channel being between said die manifold tube and said outermost surface of each set of tubes.

2. The improved manifold assembly according to claim 1 wherein said first end of the die has formed therein a venting channel outlet.

3. The improved manifold assembly according to claim 2 wherein said venting channel outlet is a single aperture.

4. The improved manifold assembly according to claim 1 wherein each venting channel converges into a common enclosed airspace.

5. The improved manifold assembly according to claim 4 wherein said common enclosed airspace is located directly adjacent said venting channel outlet.

6. An improved manifold assembly for use in the extrusion of a plastic with the manifold assembly comprising a die having a first end and a second end, said die having a die head secured at said second end, sets of a plurality of tubes located centrally of one another, each said set positioned longitudinally within a respective die manifold tube, each said set of tubes having an outermost surface with the outermost surface of each said set of tubes spaced a first distance from said respective die manifold tube, each of said respective die manifold tubes extending through the die, at least two calibration fingers secured to the die, each of said calibration fingers having a proximal portion adjacent said die head, said proximal portion of each of said calibration fingers being spaced a second distance from said die head, and a venting channel, said manifold assembly being vented to atmosphere by said venting channel, said venting channel extending from between said proximal portion of each of said calibration fingers and said die head to the first end of said die with a portion of said venting channel being between said die manifold tube and said outermost surface of each set of tubes, said first end of the die having formed therein a venting channel outlet.

7. The improved manifold assembly according to claim 6 wherein each of said venting channels converges into a common enclosed airspace directly adjacent said venting channel outlet.

\* \* \* \* \*